United States Patent
Hicks, III et al.

(10) Patent No.: US 7,584,263 B1
(45) Date of Patent: Sep. 1, 2009

(54) SYSTEM AND METHOD FOR PROVIDING SERVICES ACCESS THROUGH A FAMILY HOME PAGE

(75) Inventors: John Alson Hicks, III, Roswell, GA (US); Randy S. Zimler, Gainesville, GA (US)

(73) Assignee: AT&T Intellectual Property I, L. P., Reno, NV (US)

( * ) Notice: Subject to any disclaimer, the term of this patent is extended or adjusted under 35 U.S.C. 154(b) by 594 days.

(21) Appl. No.: 10/254,183

(22) Filed: Sep. 25, 2002

(51) Int. Cl.
*G06F 15/16* (2006.01)

(52) U.S. Cl. .................. 709/217; 709/224; 709/227; 726/16

(58) Field of Classification Search .......... 709/248, 709/249, 225, 227, 228, 224, 217, 220; 707/4, 707/1; 705/35, 34, 26; 434/350; 726/16
See application file for complete search history.

(56) References Cited

U.S. PATENT DOCUMENTS

| | | | |
|---|---|---|---|
| 5,224,098 A | 6/1993 | Bird et al. | |
| 5,708,780 A | 1/1998 | Levergood et al. | |
| 5,805,803 A * | 9/1998 | Birrell et al. | 726/12 |
| 5,913,210 A * | 6/1999 | Call | 707/4 |
| 5,964,830 A | 10/1999 | Durrett | |
| 5,983,227 A | 11/1999 | Nazem et al. | |
| 5,999,971 A | 12/1999 | Buckland | 709/218 |
| 6,081,900 A * | 6/2000 | Subramaniam et al. | 726/19 |
| 6,151,624 A * | 11/2000 | Teare et al. | 709/217 |
| 6,223,177 B1 | 4/2001 | Tatham et al. | |
| 6,226,752 B1 | 5/2001 | Gupta et al. | 726/9 |
| 6,286,039 B1 | 9/2001 | Van Horne et al. | |
| 6,327,628 B1 | 12/2001 | Anuff et al. | |
| 6,345,291 B2 | 2/2002 | Murphy et al. | |
| 6,381,579 B1 | 4/2002 | Gervais et al. | |
| 6,564,254 B1 | 5/2003 | Shoji et al. | 709/217 |
| 6,567,122 B1 | 5/2003 | Anderson et al. | |
| 6,640,302 B1 | 10/2003 | Subramaniam et al. | 713/169 |
| 6,643,652 B2 * | 11/2003 | Helgeson et al. | 707/10 |
| 6,643,683 B1 | 11/2003 | Drumm et al. | |
| 6,760,746 B1 | 7/2004 | Schneider | |
| 6,816,871 B2 | 11/2004 | Lee | |
| 6,839,680 B1 | 1/2005 | Liu et al. | |
| 6,937,842 B2 * | 8/2005 | Uchimura et al. | 434/350 |
| 6,954,799 B2 | 10/2005 | Lerner | |

(Continued)

OTHER PUBLICATIONS

"HomePortal Residential Gateways," www.2wire.com/home/hp_index.html, 2002, 2Wire, Inc., pp. 1-3.

(Continued)

*Primary Examiner*—Khanh Q Dinh
(74) *Attorney, Agent, or Firm*—Scott P. Zimmerman PLLC (57) ABSTRACT

Systems and methods for providing computerized services access through a family home page are described. A family home page in a service provider network provides a mechanism for accessing a variety of services, executing on computers that form part of a home network and on computers in the service provider network. A subscriber registers for a particular service and is then provided access by a link being automatically placed on the user's family home page. The actual physical location of the service and the manner in which it operates are transparent to the subscriber. The subscriber may perform functions to control access to the services based on which member of the household logs onto the service.

22 Claims, 6 Drawing Sheets

U.S. PATENT DOCUMENTS

| | | | |
|---|---|---|---|
| 6,968,389 B1 | 11/2005 | Menditto et al. | |
| 7,013,289 B2* | 3/2006 | Horn et al. | 705/26 |
| 7,120,632 B2* | 10/2006 | Helmbrecht et al. | 707/8 |
| 7,124,188 B2 | 10/2006 | Mangipudi et al. | |
| 7,167,899 B2* | 1/2007 | Lee et al. | 709/204 |
| 7,225,249 B1* | 5/2007 | Barry et al. | 709/227 |
| 7,290,129 B2 | 10/2007 | Chebolu et al. | |
| 2001/0031456 A1* | 10/2001 | Cynaumon et al. | 434/350 |
| 2002/0091836 A1* | 7/2002 | Moetteli | 709/227 |
| 2002/0106071 A1 | 8/2002 | Uppaluru | |
| 2002/0152307 A1 | 10/2002 | Doyle et al. | |
| 2002/0188539 A1* | 12/2002 | Axelrad et al. | 705/35 |
| 2003/0028599 A1 | 2/2003 | Kolsky | |
| 2003/0074342 A1* | 4/2003 | Curtis | 707/1 |
| 2003/0078987 A1* | 4/2003 | Serebrennikov | 709/217 |
| 2003/0177187 A1 | 9/2003 | Levine et al. | |
| 2004/0193513 A1 | 9/2004 | Pruss et al. | |
| 2005/0027887 A1* | 2/2005 | Zimler et al. | 709/249 |
| 2005/0091164 A1 | 4/2005 | Varble | |
| 2005/0183061 A1 | 8/2005 | Papanikolaou et al. | |

OTHER PUBLICATIONS

"HomePortal 100 Residential Gateway," www.2wire.com/support/pdf/hpl100.pdf, 2000, 2Wire, Inc. pp. 1-2.

"Backup When Losing Data is Not an Option," www.backup.com/contact.html, pp. 1-2.

"Backup When Losing Data is Not an Option," www.backup.com/product_info.html, pp. 1-3.

"The Family Portal.Com." www.familyportal.com/vpdefalt.asp?s=Family, Vertical Portals LLC, pp. 1-3.

U.S. Final Official Action dated Oct. 19, 2007 cited in U.S. Appl. No. 10/918,029.

* cited by examiner

SYSTEM AND METHOD FOR PROVIDING SERVICES ACCESS THROUGH A FAMILY HOME PAGE

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

FIELD OF THE INVENTION

The present invention generally relates to providing users a single access point for services executing on devices on heterogeneous networks. The present invention more particularly relates to providing family members access to services executing on devices in the home or in the network via a family home page.

BACKGROUND

In November 2001, there were 6.5 million home networks in North America, and by 2006, that number is expected to grow to almost 30 million (Meeks, Fleming; *The Next Big Thing*; Barron's Online, Nov. 12, 2001). Families use home networks most often to share files, a printer, and an Internet connection. The needs of each computer user in the family, however, vary with age, interests, and level of comfort with the technology. Ideally, the network recognizes each member of the family as a different user with different preferences and provides helpful links especially for that user. Further, the administration of a network requires specific knowledge that a layperson does not have. Therefore, virtually all home networks are and will be used by families who do not have the skill or knowledge to correct the inevitable issues that arise with computer hardware and software. Moreover, families increasingly are saving important information onto their home computers, resulting in additional issues. For example, in order to protect against the loss of the information, the family must save a second copy of the information in a different, and preferably remote, location. Also, families are now more likely to desire access to information from the home network when away from home.

Conventional approaches to address these issues either are incomplete or require a confusing and often incompatible array of hardware and software. A router is one conventional solution to home networking. A router, however, merely distributes an Internet connection to several computers, and does not provide personalized settings for different users. An Internet service provider (ISP), on the other hand, almost always allows each account to have several usernames with personalized settings, but in general the usernames are only related to separate email accounts. The services provided do not include that of helping users to maintain home networks. While the Internet service is compatible with home networks, the users must set up the networks themselves or have someone do it for them. Another existing solution that does not assist with network upkeep is a family-oriented website, sometimes called a portal, that provides links to other websites that might interest families. Such a portal is external to the home network and consequently is not able to provide assistance with the network's operation. Finally, such a portal does not offer backup storage space. Data storage services are available on the Internet, but they are generally limited to data storage. If a family chooses to use such a service for data storage, the family will have to solve the other issues of home networking with different services that might not be compatible with the data storage solution and may be difficult to manage.

One conventional approach to home networking is to use a router to connect several home computers to one Internet connection. The router may come with software that provides a starting page for browsing the Internet. Often, the starting page is linked to the website of the company that produces the router, and sometimes that website provides data storage space. The user loads the included software onto each computer to be connected to the network, and that software provides a beginning screen each time a user wants to access the Internet. The disadvantage of this beginning page is that it is the same on all machines. This is not ideal because children often have different interests than their parents, particularly with regards to content on the Internet. For example, a link to a stock market report may not be useful to a child, and a link to a chat rooms may not be useful to parents.

Another approach to family Internet use is to choose an Internet service provider (ISP) that allows each account to have several different usernames. Then the family can give a username to each member of the family, and consequently each member will receive more personalized attention. For example, America Online, (America Online, Inc., Dulles, Va.) allows each account to have several different screen names, or user identities. After a particular user enters a screen name to access the Internet, a beginning page with personalized settings appears. This service is comprehensive for users with only one computer, but not for users with multiple computers on a network. The weakness of this approach is that although this service is compatible with a home network, it does not provide assistance in creating or maintaining that network. As a result, the family must either manage the network or procure management services from another entity.

Certain websites, sometimes called portals, exist to provide useful links to a specific group of people. Portals can contain links that are appropriate for families. An example of such a website is The Family Portal at www.familyportal.com. This website provides links to topics that might interest families, but these listings are not personalized for each user. In addition, the website is completely external to the home network and consequently does not assist in the home network's creation or maintenance. Finally, the website does not offer backup storage space to the users. Therefore, this website is not a comprehensive solution to the needs of a family of Internet users.

A similarly incomplete solution is a website dedicated solely to data storage. While useful for its limited purpose, it requires the user to find other Internet and networking services elsewhere. For example, backup.com, a service of SkyDesk.com (San Diego, Calif.), provides storage space for backup copies of files. After the user subscribes to the service, the user can upload copies of files onto the backup.com website, where they will be stored in case the original files are lost. Aside from data storage and transfer services, however, backup.com does not have any services for a home network. Moreover, backup.com is not designed to be a link to other sites; therefore, it is not a convenient place for a family to begin browsing the Internet. Also, if an Internet-based data-storage business fails, the subscriber may have difficulty retrieving previously backed up files.

The current state of home network services clearly indicates that a comprehensive system for networking home computers, providing Internet access with personalized settings, and providing storage space for backup copies of files and a single access point for access to services executing on devices in the home or in the network is needed.

SUMMARY

The present invention provides systems and methods for providing family members access to a broad array of services through a family home page. The services may be executing on devices in the home or on devices outside of the home. In one embodiment of the present invention, a system for providing services includes a home network in communication with a service provider network through a communication gateway to a family home page. The family home page is a website that is hosted on a web server in the service provider network. In general, access to the family home page is restricted to family members. Access to the family home page requires user authentication by providing a user name and password. Family members can access the family home page when they are in the home or outside of the home using an access device, such as a personal computer. The family home page includes a plurality of links including a link to a first application on the home network and a second application on the service provider network. To control access and to provide flexibility, the system also includes a data store, such as a database, for storing records related to the services and an individual services profile for each family member. A family member, typically a parent, will function as a services administrator and be able control which family member and other individuals have access rights to the family home page and to which services on the family home page. For example, the parent functioning as the services administrator may restrict children in the family from accessing on-line banking or on-line shopping services. In one embodiment of the present invention, an application services gateway or a communication gateway located in the home is operable for executing the applications necessary for providing a service.

In an embodiment of the present invention, a subscriber utilizes an access device to access a service via their family home page. The access device may comprise any device capable of displaying standard user interfaces, including devices capable of displaying hypertext markup language pages. Such devices include a personal computer, a telephone, and a wireless access device, such as a personal digital assistant (PDA) or cell phone. A service application may execute on a device in the home or outside the home. In either case, the application executes on a device that includes some type of processor and a means for communicating with the network.

Any type of application that would be valuable to members of a home may be provided by an embodiment of the present invention. For example, an embodiment may include applications, such as a calendar, a bulletin board, a to-do list, unified messaging, and a directory. In addition, applications such as home security, HVAC control, lighting control, audio distribution, and multimedia-on-demand may prove valuable to a user of the present invention.

In a method according to the present invention, a computer program executing on a processor, such as a web server, identifies a first application capable of execution within the home and determines the address or other method for accessing the application. The web server then creates an HTML family home page that includes a link to the application. The web server also includes a second link to a second application that executes outside the home. Since the family home page is provided as an HTML page, the subscriber may access the page from either a device in the home or a device outside the home that is in communication with the service provider network.

Attributes for the services, the subscriber, and other relevant components of an embodiment of the present invention may be stored in a database. The database is in communication with the family home page and may be present in the home network, the provider network, or multiple databases may be stored in both. An embodiment includes a mechanism to identify individual users and to differentiate service offerings for each identified user through the establishment of a user profile for each individual user. When an individual family member accesses the family home page, they will be presented with a personalized view of the family home page that only contains dynamic links to the services that they have rights to access.

Embodiments of the present invention are preferably computer programs encoded on computer-readable medium, such as volatile and non-volatile storage devices. The computer program code may include scripts, object-oriented components, and other types of executable code combined with static elements, such as HTML or extensible markup language (XML) pages and style sheets (XSLT).

Embodiments of the present invention provide numerous advantages over conventional systems and methods. An embodiment provides a means to utilize a family home page to provide family members a single access point for to a variety of computerized services and provides various mechanisms for parental control of children's access to various services and content. By treating the family as an organizational unit, an embodiment of the present invention provides the service provider with an opportunity to differentiate a service offering according to the present invention from service offerings provided by the service provider's competitors. Some of the services, which are accessible via the family home page, may be utilized by all family members, such as a family calendar, whereas other services may be utilized by an individual, such as a personal calendar.

Also, in an embodiment of the present invention, the location of services is transparent to the user. The service provider performs analyses and makes decisions regarding where particular services should be located, where they should execute, and how the subscriber should access the available services. The service provider then installs the necessary packages and creates or modifies entries in the service database so that subscribers can access the service. When a family member subscribes to a new application, a link to the new application is automatically added to the family home page.

Further details and advantages of the present invention are set forth below.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Embodiments of the present invention provide systems and methods for providing computerized services to the home. In one embodiment, a family home page in the service provider network provides a mechanism for family members to access a variety of services, executing on computers that form part of a home network and on computers in a provider network. A subscriber registers for a particular service and is then provided access to the service via a link that is automatically established on the family home page. The actual physical location of the service and the manner in which it operates are transparent to the user.

Embodiments of the present invention are preferably computer programs encoded on computer-readable medium, such as volatile and non-volatile storage devices. The computer program code may include scripts, object-oriented components, and other types of executable code combined with static elements, such as HTML or extensible markup language (XML) pages and style sheets (XSLT).

Figure 1:
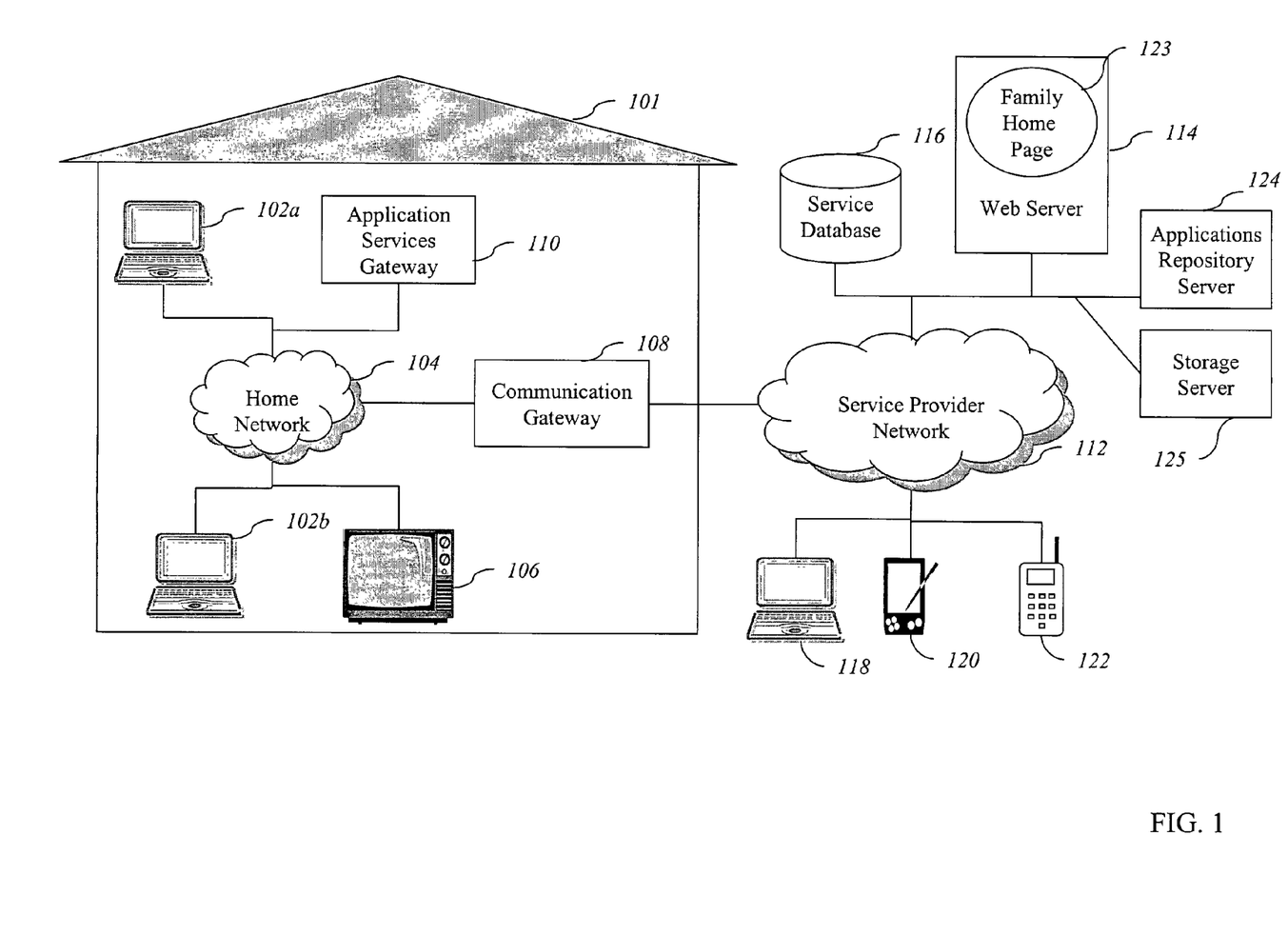
FIG. 1 is a block diagram, illustrating an exemplary environment for operation of an embodiment of the present invention.

Referring now to the drawings in which like numerals indicate like elements throughout the several Figures, FIG. 1 illustrates an exemplary environment for operation of an embodiment of the present invention. The embodiment shown includes various elements located within a home 101. An embodiment of the present invention works to enable the family as an organizational unit. These elements include a number of home computers 102a, b interconnected via a home network 104. Also connected to the home network is a television 106. The television 106 connects to the network 104 through a wired or wireless connection using standard networking protocols. Alternatively, a set top box (not shown) may provide for communication between the network and with the television 106.

The home network 104 connects to external networks through a communication gateway 108. The communication gateway 108 includes various components to facilitate networking. For example, in an embodiment utilizing a digital subscriber line (DSL) connection, communication gateway 108 may include a DSL modem, firewall software, processor, memory and a router. The communication gateway 108 also includes wide area networking features to allow users to access components of the home network 104 from outside the home 101.

The embodiment shown also includes an application services gateway 110 for executing applications within the home 101. The applications services gateway 110 includes a processor and memory. The applications services gateway 110 may be, for example, a Microsoft Windows, Linux, or Unix-based computer. The application services gateway 110 also includes a network interface for communicating with the home network 104. The applications that execute on the applications services gateway 110 and the communication gateway 108 are available to members of the family both inside the home and from outside the home via wide area networking.

The communication gateway 108 of the embodiment shown connects to a service provider network 112, such as a local exchange carrier (LEC) network. For example, in an embodiment in which the provider network is a DSL network, the communication gateway 108 includes a DSL modem and connects to the service provider's digital subscriber line access multiplexer (DSLAM) in a central office of the provider network 112 via the local telephone loop. In the embodiment shown, service provider network 112 is the network operated by the regional bell operating company. The provider performs various tasks, including downloading applications, updating applications and data, maintaining control programs, and allowing third-party access to services within the network 112.

Also in communication with the provider network 112 is a web server 114, a service database 116, a family home page 123 executing on the web server 114, an applications repository server 124, and a storage server 125. The web server 114 responds to requests, such as hypertext transfer protocol (HTTP) requests, with documents, such as hypertext markup language (HTML) documents. The service database 116 may be an Oracle, Microsoft SQL Server, or other database that stores information necessary to provide services to subscribers. The web server 114 may also provide applications executing under a common gateway interface (CGI), Microsoft Active Server Pages (ASP), or other environment. The web server 114 hosts the family home page 123 website and may host other applications. The applications repository server 124 stores applications that can be downloaded to the application services gateway 110 or communication gateway 108 in the home. The storage server 125 is linked with the family home page 123. Users are able to store files on the storage server 125 associated with their family home page 123. The files are accessible by users when they are in the home or out of the home via the family home page.

In an embodiment of the present invention, the subscriber may use a variety of means and devices to access services via their family home page 123. The service provider network 112 provides service access to devices, including computer 118, personal digital assistant 120, and cellphone 122. Many other devices, which are not shown, may also access services via the provider network 112.

Figure 2:
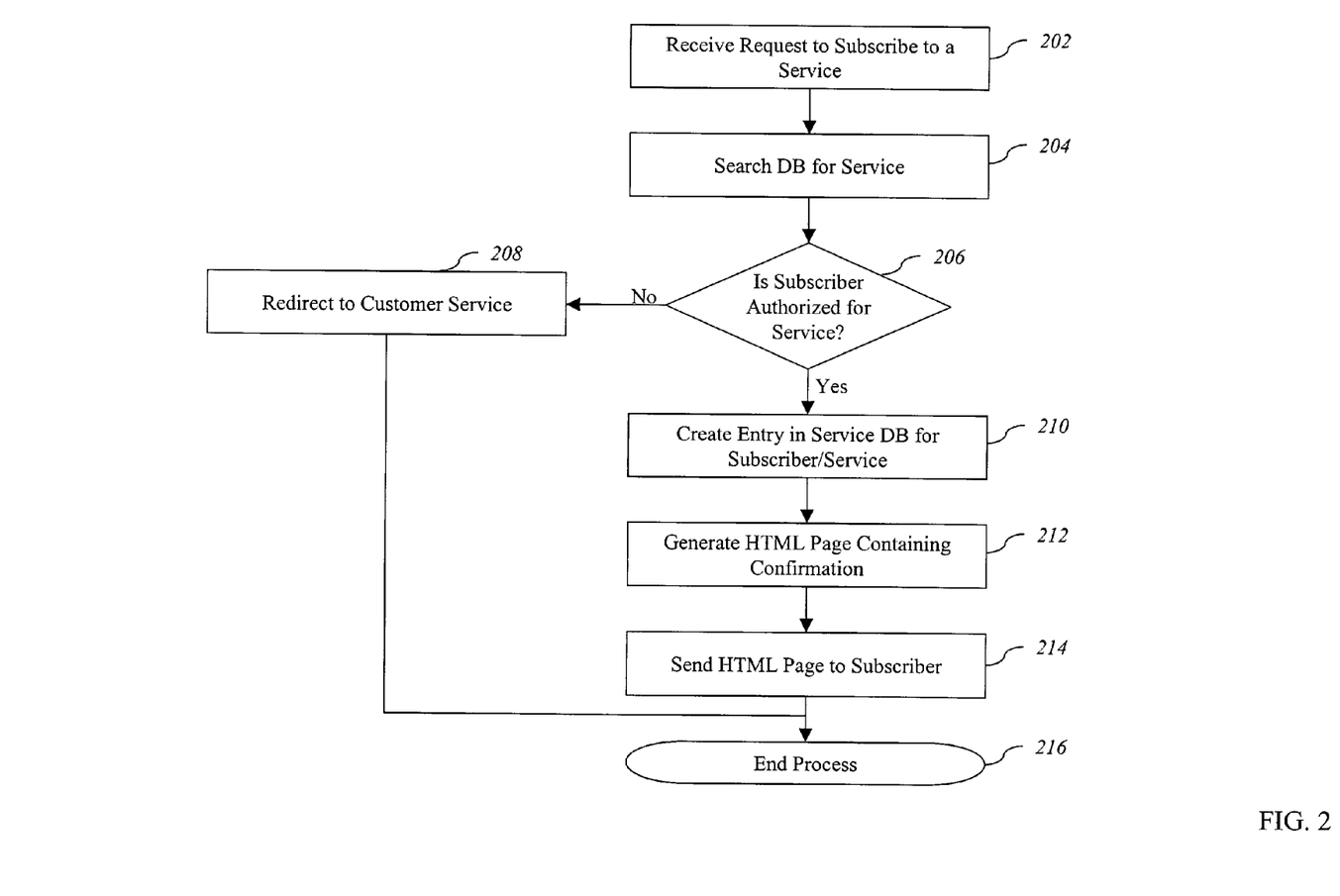
FIG. 2 is a flow chart, illustrating the process of requesting a service in an embodiment of the present invention.

FIG. 2 illustrates a process of subscribing to a service in an embodiment of the present invention. Subscribing to a service, which is also referred to as registering for a service, may entail calling a service representative, mailing in a subscription form, or filling out a form via a web server, such as web server (114). In the process shown, the service provider receives a request from a user to subscribe to a 202 on the web server (114) that will be accessible via the user's family home page (123). For example, the user may wish to take advantage of a backup service. In response to receiving the request, a program executing on the web server (114) searches the service database (116) 204 for services that the user has registered for or that the user is authorized to use. Using the retrieved data, the web server (114) next determines whether or not the subscriber is authorized for the requested service 206. In the embodiment shown, if the program executing on the web server (114) determines that the subscriber does not have authorization, the web server (114) redirects the subscriber's request to, for example, customer service 208. A customer service representative or automated program may then provide instructions to the subscriber for gaining access. A comparable process would apply to adding a service on the application services gateway (110) or communications gateway (108) in the home.

Alternatively, the subscriber may designate a destination for unauthorized service requests to be redirected. For example, a subscriber may designate certain adult-oriented services as blocked from particular members of the subscriber's family. The subscriber may further designate a page, explaining these limitations, as the destination for requests that the web server (114) determines are not authorized to access the blocked sites. When the members of the family that are not authorized to access the service attempt to access the service, the web server (114) redirects the request to the designated page.

If the subscriber is authorized for the service, the web server (114) creates an entry in the service database (116) for the subscriber, service combination 210. For example, if a subscriber's child wishes to access a backup service, the web server (114) searches the service database (116) to determine whether the subscriber has put any limits on access to the backup service. If the subscriber has no access restrictions to the service, and there are no other limitations on who may access the service, the web server (114) creates an entry linking the service with the user so that a link to the service appears on the user's personalized view of the family home page.

Referring again to FIG. 2, the web server (114) next generates an HTML page containing a confirmation of the service addition 212. The HTML page may contain additional information, including any service usage instructions or other pertinent information. The web server (114) next sends the HTML page to the subscriber 214, and the process ends 216.

Figure 3A:
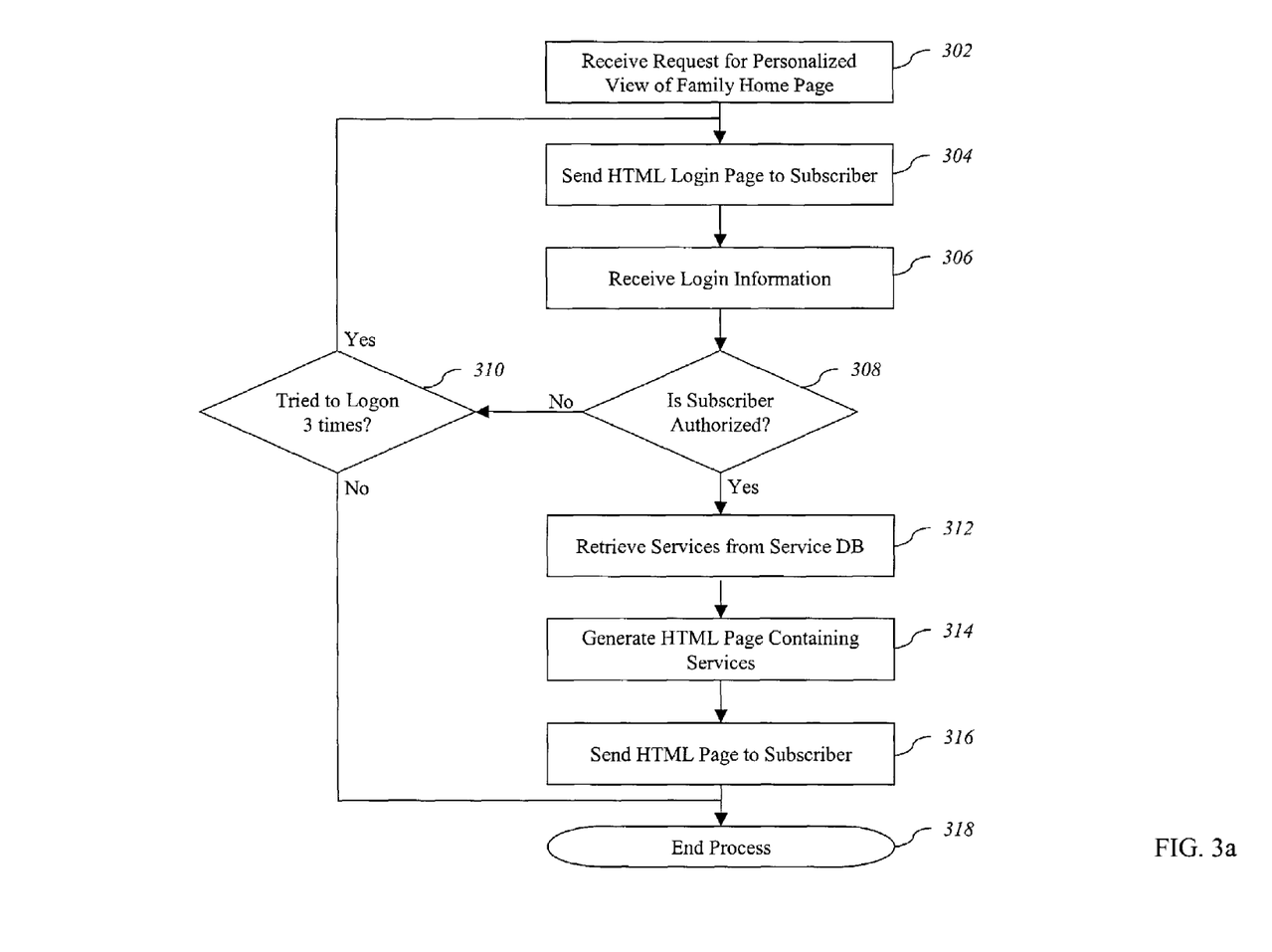
FIG. 3a is a flow chart, which illustrates a process of providing a personalized view of the family home page to a subscriber in one embodiment of the present invention.

FIG. 3a is a flow chart, which illustrates a process of providing a personalized view of the family home page to a subscriber in one embodiment of the present invention. The personalized view of the family home page only contains links to services that the individual is authorized to access. In the process shown, the web server (114) receives a request for a personalized view of the family home page from the user 302. A personalized view of the family home page contains links and other content, such as graphics or photographs, previously specified by the subscriber during a registration or other process or set up as default content by the service provider. In response to the request, the web server (114) sends an HTML page containing a login form to the subscriber 304. The subscriber fills in the login information and submits the form to the web server (114). The web server (114) receives the login information 306.

The web server (114) verifies that the subscriber is authorized to access a personalized view of the family home page 308. If the authorization fails, the web server (114) allows two additional attempts to log on 310. If the three attempts fail, the process ends 318. If the authorization is successful, the web server (114) retrieves service information for the subscriber from the service database (116) 312. In an embodiment of the present invention, the service information includes a variety of individual data elements. These data elements identify the service type, where the service executes, and additional parameters necessary to provide the service to the subscriber. For example, in one embodiment of the present invention, the service database includes a uniform resource locator pointing to a family calendar web site on the web server (114). In another embodiment, the service database includes a reference to a backup program that is installed on each computer in the home (101) and is operable for backing up data from the computers to a storage server (125) within the service provider network (112).

The web server (114) utilizes the service information to generate an HTML page (personalized view of the family home page), which contains links to the various services available to the subscriber 314, and more specifically, available to the member of the subscriber's family who is currently logged in. The web server (114) then sends the resultant HTML page to the subscriber 316. The process then ends 318.

Figure 3B:
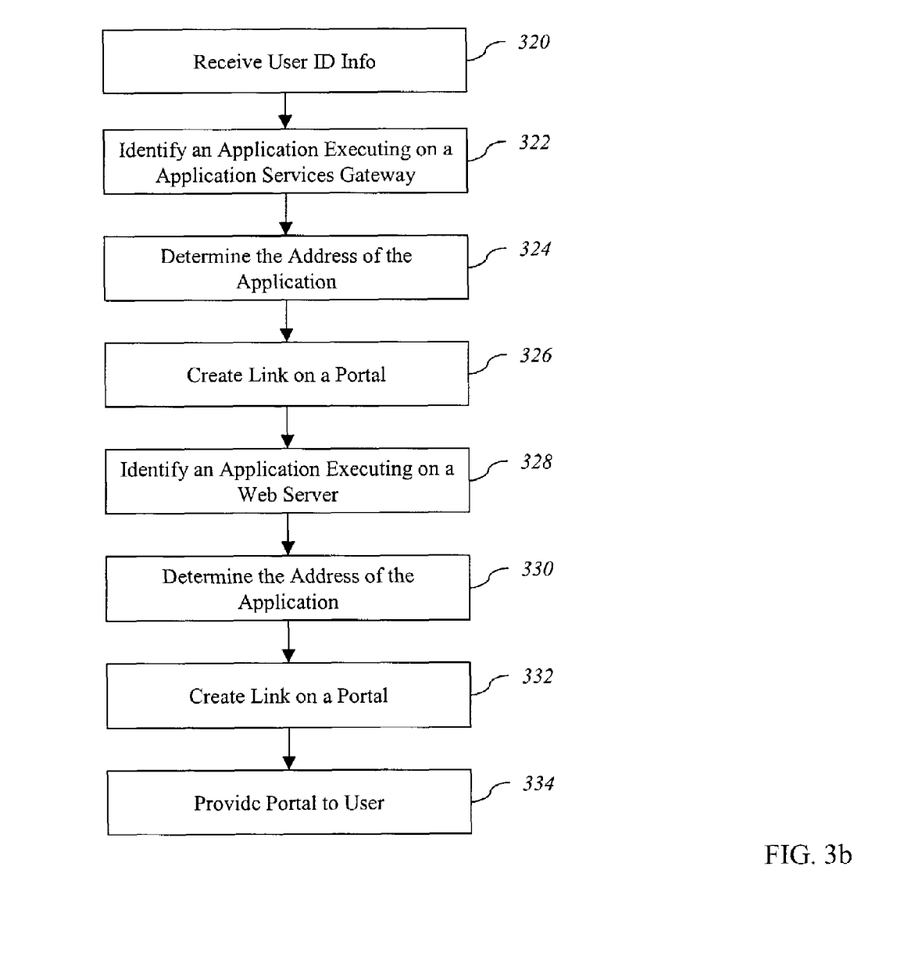
FIG. 3b is a flow chart illustrating a part of the process illustrated by FIG. 3a in greater detail for a particular embodiment of the present invention.

FIG. 3b is a flow chart illustrating steps 314-316 in greater detail for a particular embodiment of the present invention. In the shown, the web server (114) receives user identification information, such as a username/password combination 320. In response, the web server (114) searches the database (116) and identifies an application that executes on the communication gateway (108) in the home (101) 322. The actual executable code may reside elsewhere in the home network (104) or the service provider network (112), however, the code executes on the processor in the communication gateway (108). The web server (114) next determines the address of the application based on the data retrieved from the database (116) 324. For example, the data retrieved from the database may include the Internet protocol (IP) address of the communication gateway (108) as well as an executable name. Alternatively, the communication gateway (108) may include web server software. In that case, the data may include the IP address and a web location in the form of a uniform resource locator (URL). For example, in one embodiment, the communication gateway (108) functions as a dynamic host configuration protocol (DHCP) server to computers within the home (101) and as a DHCP client to the provider network (112). In such an embodiment, the communication gateway (108) has an internal address, such as 192.168.0.1, in the internal network. The service database (116) includes the internal address and the name of the website, for example, 192.168.0.1\WebSiteName. The web server (114) includes a program, such as an ASP program, that creates a portal page. When the web server (114) retrieves the information about the application that executes on the communication gateway (108), the web server creates a link on the family home page that links to the website on the communication gateway (108) 326.

The web server (114) may identify multiple applications to which the user has access. In the embodiment shown, the web server (114) identifies a second application that executes on the web server (114) itself 328. The web server (114) determines the address (of itself) from the data retrieved from the database (116) 330 and creates a link to the address on the family home page 332. The web server (114) then provides the family home page (123) to the user via the communication gateway (108) 334. In the embodiment shown, steps 322 and 328 in FIG. 3b correspond to step 312 in FIG. 3a; steps 324 and 330 correspond to step 314; and steps 326 and 332 correspond to step 316.

Once the user of an embodiment of the present invention is presented with the web page containing links to services (family home page), the user accesses those services. The services may execute on any of the various available platforms illustrated in FIG. 1. Execution of a service may occur on multiple machines and may vary over time. For example, a service for providing the user with a way to organize contacts, including names, addresses, and phone numbers, may include a database and a user interface executing on the application services gateway 110. Later, the service provider may determine that it is more efficient to save all subscribers' databases of contacts on a database within the service provider network 112 but continue to execute the user interface from the application services gateway 110 to ensure acceptable response times. The provider can accomplish the movement of the application and corresponding references to the application in a number of ways. For example, the provider can manually change the links on various web pages to point to the relocated database. Alternatively, the service provider may create a database of services, such as service database 116, which allows the provider to simply make changes to records in the database when the location or operation of a service is changed.

Figure 4:
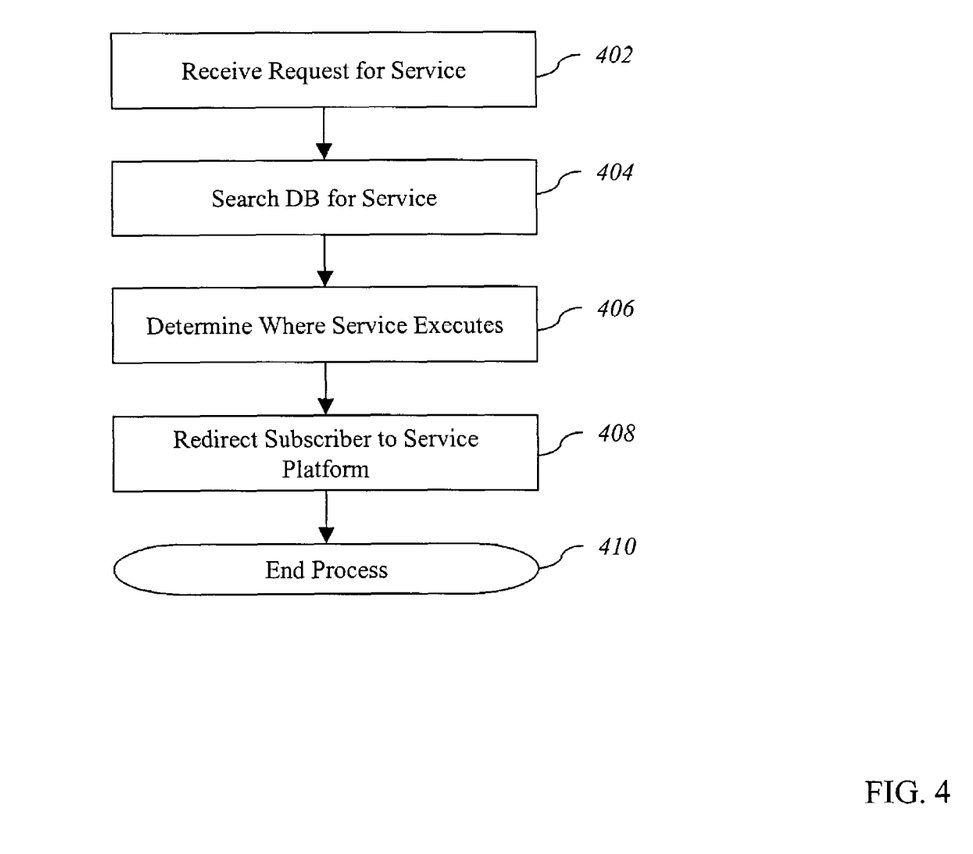
FIG. 4 is a flow chart, illustrating a process for responding to requests for services from a user in an embodiment of the present invention.

FIG. 4 is a flow chart illustrating a process for responding to requests for services from a user. The process illustrated by FIG. 4 may be carried out on any of the computer platforms illustrated in FIG. 1. In one embodiment, the communication gateway 108 executes the process. When the user views the HTML page (family home page) that contains links to services, the user selects a service by clicking on the corresponding hyperlink. As a result of the user's selection, the communication gateway (108) receives a request for service from the user via a network access device, such as PC (102(*a*)) 402. The communication gateway (108) searches an internal or external database (not shown) for the entry corresponding to the user's request 404. The database returns a record that contains information related to the service. Using this record, the communication gateway (108) determines on which platform the application is stored and/or executes 406. For example, the record may contain the IP address or server name and the name of an executable or other program file. The communication gateway (108) utilizes this information to redirect the user's request for service to the platform that provides the service 408. Since the application may reside and/or execute on the communication gateway (108) itself, redirection also encompasses handling the request via an executable on the same machine that receives the request. Once the user's request has been redirected, the process ends 410.

Figure 5:
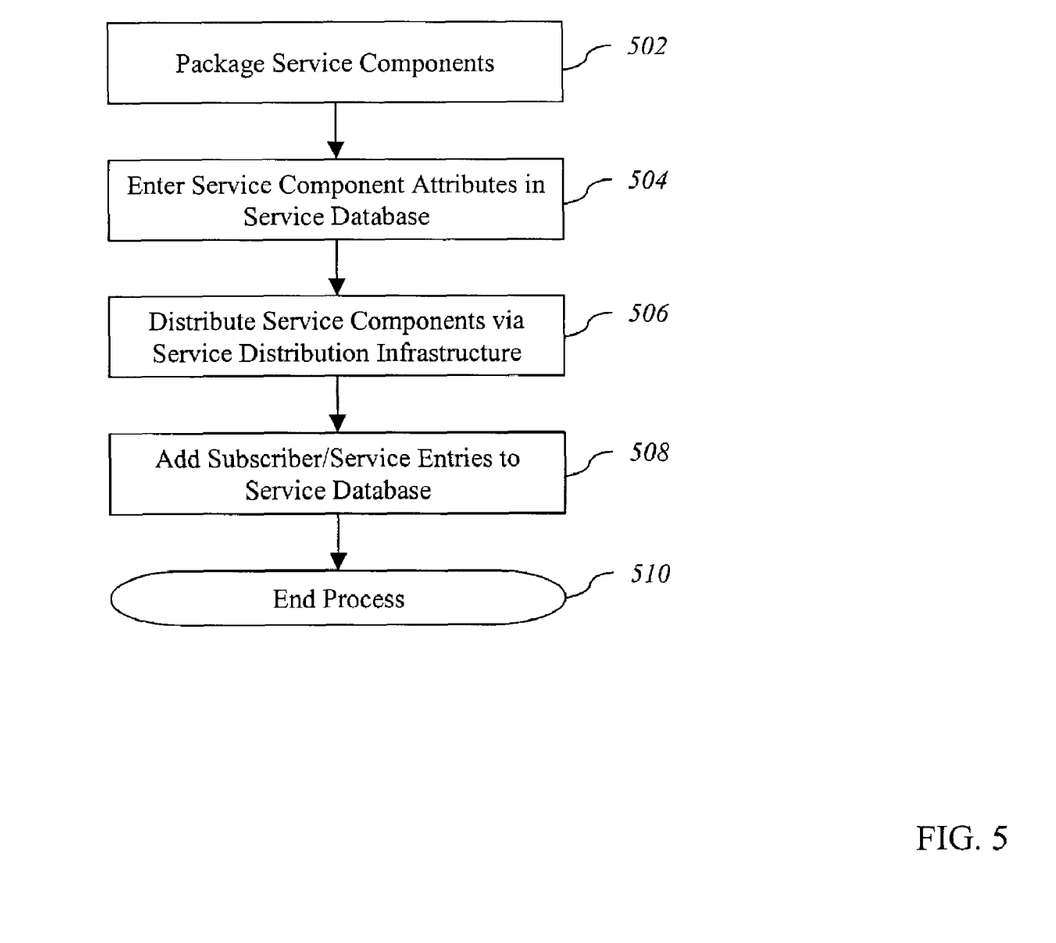
FIG. 5 is a flow chart illustrating a method of installing the components remotely in an embodiment of the present invention.

Embodiments of the present invention include administrative tools for the service provider. For example, the service provider may use a variety of methods for installing applications within the service provider's network (112). It may be more difficult to install components within the subscriber's home (101). In order to perform these installations, the service provider has three basic options: (1) the subscriber performs the install; (2) the service provider sends someone to the subscriber's home to perform the install; or (3) the service provider installs the components remotely. FIG. 5 is a flow chart illustrating a method of installing the components remotely in an embodiment of the present invention. In the embodiment shown, the service provider creates packages for distributing the components of a particular service 502. The term "package" is to be defined broadly. For example, a package may comprise a .cab (cabinet) file or some other type of self-extracting file. A package may also comprise information stored in a software distribution product, such as Microsoft's System Management Server (SMS). Software distribution products automate the process of distributing software across both homogonous and heterogenous networks.

In the embodiment shown in FIG. 5, the provider next enters service component attributes in the service database (116) 504. The communication gateway (108) uses these attributes to determine where to direct user requests as illustrated in FIG. 4. Once the package has been created, the service provider distributes the components via a service distribution infrastructure 506. The infrastructure includes the automated software distribution system, if present, along with any necessary software and/or hardware for distributing and installing the components. In the embodiment shown, a user cannot access a service until the service provider authorizes that user. In order to authorize a user to utilize a particular service, the service provider adds a user-service relationship entry to the service database (116) 508. The communication gateway (108) searches for the user-service entry whenever a user requests a particular service.

In an embodiment of the present invention, the provider has numerous opportunities to add value for a subscriber. Consequently, the provider has various options for deriving revenue from the installation, provisioning, and support of the various services. For example, a provider may charge the subscriber a monthly charge for each registered service. The service provider may also charge the subscriber a monthly charge for equipment rental for the communication gateway, application services gateway, and other components present in an embodiment.

In addition, the provider may derive revenue from other sources, such as third-party service providers. If the provider of the network and infrastructure provides a mechanism for subscribers to access a third-party service, the provider may charge the third party for providing the mechanism. The third party, in turn, charges the subscribers for accessing the service.

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

What is claimed is:

1. A method for providing network-based access to computer applications, the method comprising:
   communicating with a residential communications gateway executed from a family home page;
   including in the family home page a link to a first application on a residential network and another link to a single second application on a service provider network;
   receiving a request for service from a residential user;
   searching a services database by a processor for services that the residential user is authorized to access;
   differentiating service offerings for the residential user from other users in the services database;
   when the residential user is not authorized to access the requested service, retrieving a destination web page from memory and redirecting the request for service to the destination web page to deny the requested service;
   when the residential user is authorized to access the requested service, creating an entry by the processor in the service database that links the requested service to the residential user and creating a website link on the family home page associated with the residential user, the website link accessing the first application that provides the requested service;
   associating the first application with the residential user;
   associating the second application with the residential user;
   determining a first address of the first application;
   determining a second address of the second application; and
   providing access to the residential user to the second address by providing a second link to the second address on the family home page.

2. The method of claim 1, further comprising identifying the first application on the family home page.

3. The method of claim 1, further comprising identifying that the first application executes on the gateway.

4. The method of claim 1, further comprising identifying an application selected from a group consisting of home security, HVAC control, lighting control, audio distribution, and multimedia-on-demand.

5. The method of claim 1, further comprising identifying that the second application executes on a web server.

6. The method of claim 1, further comprising identifying an application selected from a group consisting of a calendar, a bulletin board, a to-do list, unified messaging, and a directory.

7. The method of claim 1, further comprising receiving a username and password.

8. The method of claim 1, further comprising retrieving the family home page from a network access device.

9. The method of claim 1, further comprising retrieving the family home page from a network access device selected from a list comprising a personal computer, a telephone, and a wireless access device.

10. The method of claim 1, further comprising providing a registration user interface for adding available applications from the family home page.

11. The method of claim 1, further comprising providing electronic storage on a data store.

12. A computer-readable storage medium having computer program code stored thereon for providing network-based access to computer applications, the computer-readable storage medium comprising:
  program code for communicating with a residential communications gateway executed from a family home page;
  program code for including in the family home page a link to a first application on a residential network and another link to a single second application on a service provider network;
  program code for receiving a request for service from a residential user;
  program code for searching a services database by a processor for services that the residential user is authorized to access;
  program code for differentiating service offerings for the residential user from other users in the services database;
  when the residential user is not authorized to access the requested service, program code for retrieving a destination web page from memory and for redirecting the request for service to the destination web page to deny the requested service;
  when the residential user is authorized to access the requested service, program code for creating an entry by the processor in the service database that links the requested service to the residential user and for creating a website link on the family home page associated with the residential user, the website link accessing the first application that provides the requested service;
  program code for associating the first application with the residential user;
  program code for associating the second application with the residential user;
  program code for determining a first address of the first application;
  program code for searching for a record containing service information;
  program code for retrieving the service information including data elements configured to identify a subscriber, a service type, and a location of a service execution program code for determining a second address of the second application; and
  program code for providing access to the residential user to the second address by providing a second link to the second address on the family home page that is associated with the service type.

13. The computer-readable medium of claim 12, wherein the family home page comprises extensible markup language (XML) pages.

14. A system, comprising:
  a processor communicating with memory storing code, the code causing the processor to:
  communicate with a residential communications gateway executed from a family home page;
  include in the family home page a link to a first application on a residential network and another link to a single second application on a service provider network;
  receive a request for service from a residential user;
  search a services database by a processor for services that the residential user is authorized to access;
  differentiate service offerings for the residential user from other users in the services database;
  when the residential user is not authorized to access the requested service, retrieve a destination web page from memory and redirect the request for service to the destination web page to deny the requested service;
  when the residential user is authorized to access the requested service, create an entry by the processor in the service database that links the requested service to the residential user and create a website link on the family home page associated with the residential user, the website link accessing the first application that provides the requested service;
  associate the first application with the residential user;
  associate the second application with the residential user;
  determine a first address of the first application;
  determine a second address of the second application; and
  provide access to the residential user to the second address by providing a second link to the second address on the family home page.

15. The system of claim 14, wherein the first network comprises a data store.

16. The system of claim 14, wherein the second network comprises an application services gateway.

17. The system of claim 14, further comprising code for establishing access rights to the family home page.

18. The system of claim 14, further comprising code for restricting access to an application.

19. The system of claim 14, wherein the first application comprises an application selected from a group consisting of a calendar, a bulletin board, a to-do list, unified messaging, and a directory.

20. The system of claim 14, further comprising code for displaying the family home page.

21. The system of claim 14, wherein the second application comprises an application selected from the group consisting of home security, HVAC control, lighting control, audio distribution, and multimedia-on-demand.

22. The system of claim 14, wherein the family home page comprises extensible markup language (XML) pages.

* * * * *